United States Patent [19]

Larsen

[11] 4,211,058
[45] Jul. 8, 1980

[54] LAWN MOWER INCLUDING A CARBURETOR ENCLOSURE

[75] Inventor: Robert T. Larsen, Menomonee Falls, Wis.

[73] Assignee: Outboard Marine Corporation, Waukegan, Ill.

[21] Appl. No.: 933,667

[22] Filed: Aug. 14, 1978

[51] Int. Cl.² .................................................. A01D 35/20
[52] U.S. Cl. ..................................... 56/17.5; 56/320.1
[58] Field of Search ............... 56/12.8, 320.1, 17.5, 56/320.2; 130/54 A; 181/229, 225

[56] References Cited

U.S. PATENT DOCUMENTS

| | | | |
|---|---|---|---|
| 1,922,200 | 8/1933 | Frank | 181/225 |
| 3,044,239 | 7/1962 | Harkness | 56/12.8 |
| 3,500,620 | 3/1970 | Duran | 56/12.8 |
| 3,641,749 | 2/1972 | Dwyer, Jr. et al. | 56/17.5 |
| 3,796,277 | 3/1974 | Gordon | 180/54 A |
| 3,810,518 | 5/1974 | Smale | 180/54 A |

FOREIGN PATENT DOCUMENTS

| | | | |
|---|---|---|---|
| 1944645 | 5/1971 | Fed. Rep. of Germany | 56/17.5 |
| 2006643 | 8/1971 | Fed. Rep. of Germany | 56/17.5 |
| 2346461 | 7/1975 | Fed. Rep. of Germany | 56/17.5 |

*Primary Examiner*—Russell R. Kinsey
*Assistant Examiner*—Paul J. Hirsch
*Attorney, Agent, or Firm*—Michael, Best & Friedrich

[57] ABSTRACT

Disclosed herein is a lawn mower including a blade housing, wheels supporting the blade housing for movement along the ground, a rotary cutting blade supported within the blade housing, and an engine supported by the blade housing and rotatably driving the rotary cutting blade, the engine including a crankcase chamber and a carburetor connected to the crankcase chamber for conveying fuel to the crankcase chamber. The lawn mower also includes an engine housing enclosing the engine and including therein a first air intake opening, and a carburetor enclosure surrounding the carburetor for shielding the carburetor from heated air, the carburetor enclosure including a second air intake opening. A fan is also provided for conveying air from the first air intake opening into the second air intake opening.

7 Claims, 3 Drawing Figures

LAWN MOWER INCLUDING A CARBURETOR ENCLOSURE

BACKGROUND OF THE INVENTION

The present invention relates to lawn mowers and more particularly to lawn mowers having internal combustion engines provided with means to reduce the noise level of the mower when in operation and having sound enclosures surrounding the engine. The present invention also relates to a means for shielding the carburetor of the engine from heat developed within such sound enclosures and for conducting a source of cool air into the engine carburetor.

Attention is directed to the U.S. Gordon Pat. No. 3,796,277, issued July 28, 1972. That patent shows a riding lawn mower having an engine covered by an enclosure. Means are provided to convey air from outside the engine enclosure to a carburetor, but the carburetor is not shielded from the heat generated by the engine.

Attention is also directed to the following U.S. patents:

| Frederickson et al | 3,698,455 | issued October 17, 1972 |
|---|---|---|
| Ternes | 2,881,860 | issued April 14, 1959 |
| Kiekhaefer | 2,815,742 | issued December 10, 1957 |
| Kiekhaefer | 2,798,470 | issued July 9, 1957 |
| Thomas | 2,701,024 | issued February 1, 1955 |
| Davies | 2,676,559 | issued April 27, 1954 |
| Devol et al | 2,355,208 | issued August 8, 1944 |
| Frank | 1,922,200 | issued August 15, 1933 |

SUMMARY OF THE INVENTION

The invention includes a lawn mower comprising a blade housing, wheels supporting the blade housing for movement along the ground, a rotary cutting blade supported within the blade housing, and an engine supported by the blade housing and rotatably driving the rotary cutting blade, the engine including a crankcase chamber and a carburetor connected to the crankcase chamber for conveying fuel to the crankcase chamber. The lawn mower also includes an engine housing surrounding the engine and having therein a first air intake opening, and a carburetor enclosure surrounding the carburetor for shielding the carburetor from heated air within the engine housing, the carburetor enclosure including a second air intake opening. Means are also provided for conducting air from the first air intake opening into the second air intake opening.

One of the principal features of the invention is the provision in the engine housing of a fan housing in communication with the first air intake opening and the second air intake opening and for providing fluid communication between the first air intake opening and the carburetor enclosure, and a fan for conveying air through the first air intake opening into the fan housing and from the fan housing through the second air intake opening into the carburetor enclosure.

Another of the principal features of the invention is the provision of a thermal dam between the carburetor and the fuel intake chamber.

Other features and advantages of the present invention will become apparent to those skilled in the art upon reviewing the following detailed description, the drawings and the appended claims.

Figure 1:
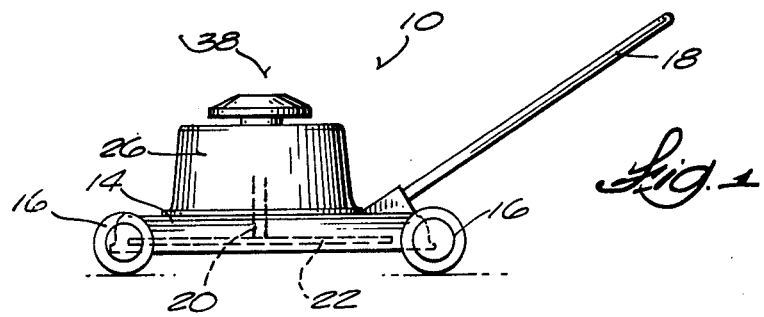
FIG. 1 is a side elevation view of a lawn mower embodying the present invention.

Before explaining one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Figure 2:
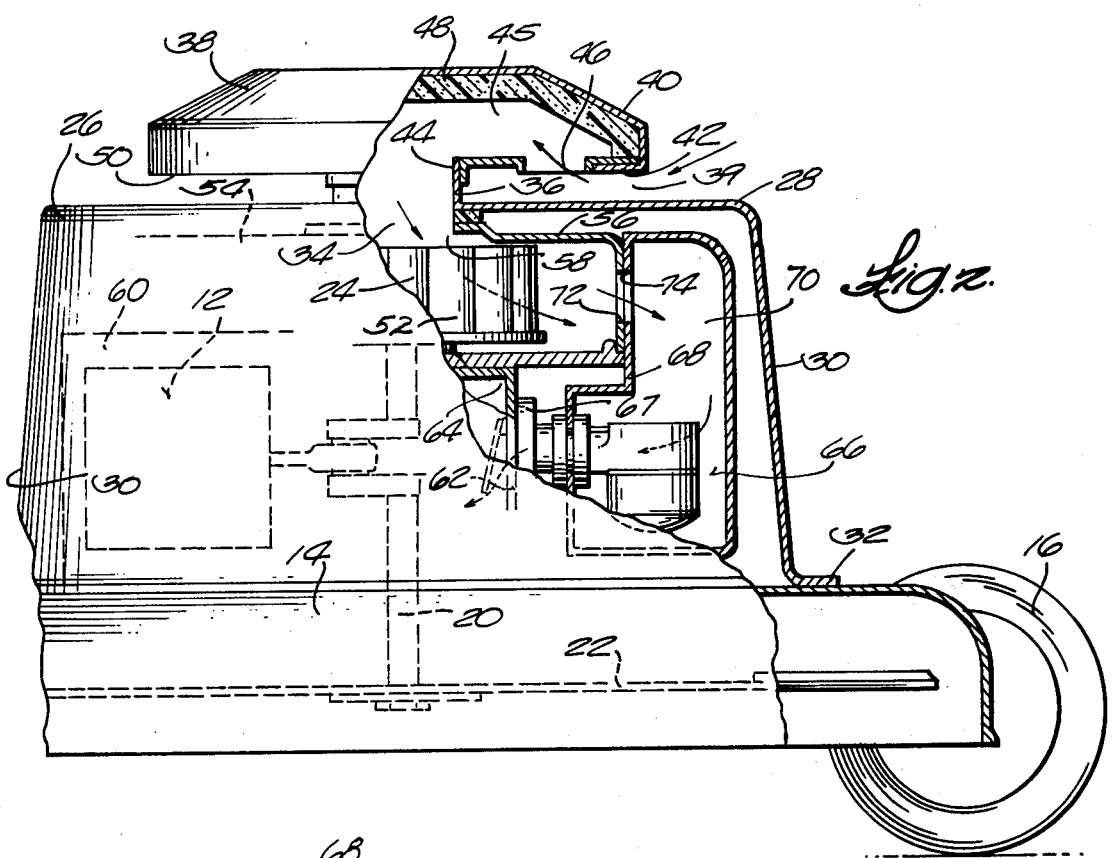
FIG. 2 is an elongated side elevation view of the engine and engine housing of the lawn mower shown in FIG. 1 and with portions broken away.

Illustrated in FIGS. 1 and 2 is a lawn mower 10 including an air cooled internal combustion engine 12 supported on a blade housing 14. The blade housing 14 is supported for movement along the ground by wheels 16 and is guided by a guiding handle 18. The engine 12 rotatably drives an engine drive shaft 20 having a rotary cutting blade 22 attached to its lower end and a rotary cooling fan 24 attached to its upper end.

Means are also provided for covering the engine 12 to provide a noise limiting enclosure for housing the engine 12. While various arrangements can be employed, in the construction illustrated in FIG. 2, the engine 12 is covered by a housing 26 which includes an upper wall 28 and side walls 30 having a lower edge 32 secured to the blade housing 14. To permit a flow of cooling air into the housing 26 to provide for cooling of the air cooled engine 12, an intake opening 34 is provided in the upper wall 28 of the housing 26. The upper wall 28 of the housing also includes a central upwardly extending cylindrical flange 36 surrounding the intake opening 34 and supporting a circular cooling air inlet silencer 38, the air inlet silencer 38 being supported above the upper wall 28 of the housing 26 such that an airflow space 39 is provided between the air inlet silencer 38 and the upper wall 28 of the housing 26. The cooling air silencer 38 includes a circular domeshaped cover 40 and a bottom wall 42, the circular cover 40 and the bottom wall 42 defining a chamber 45 therebetween. The bottom wall 42 includes a central aperture 44 for receiving the upwardly extending cylindrical flange 36 of the housing 26. The bottom wall 42 also includes a plurality of holes 46 surrounding the central aperture 44 and located between the central aperture 44 and the periphery of the circular cover 40. The inside surface of the circular cover 40 is coated with noise dissipative acoustical foam 48.

In operation, cooling air flows into the airflow space 39 beneath the rim 50 of the cooling air inlet silencer 38, and through the apertures 46 in the bottom wall 42 of the silencer 38 and then through the chamber 45 and downwardly through the air intake opening 34 of the engine housing 28.

Means are further provided for conveying air from the air inlet opening 34 into the engine housing 26 to provide for cooling of the engine 12. While various arrangements can be provided, in the illustrated construction, the cooling fan 24, driven by the engine crankshaft 20, functions to draw air into the air inlet opening 34. The cooling fan 24 includes a plurality of rotary fan blades 52 and is disposed within a fan housing 54 located within the enclosure defined by the engine housing 26. The fan housing 54 includes an upper wall 56 having therein an intake opening 58 in communication with the air intake opening 34, whereby air is drawn through air intake opening 34 into the fan housing 54. The fan housing 54 also includes an outlet (not shown) into the enclosure defined by the engine housing 26, whereby air drawn into the fan housing 54 can be forced into the enclosure surrounding the engine 12 to cool the engine. The engine housing 26 also includes a cooling air exhaust passage (not shown) to permit the cooling air to be exhausted from the engine housing 26.

The engine 12 is shown in FIG. 2 as including an engine block 60 and a crankcase 62, the crankcase 62 defining an intake chamber 64. A carburetor 66 is attached to the crankcase 62 to provide for fuel mixture flow into the crankcase chamber 64.

It is generally desirable that the temperature of the carburetor 66 be maintained relatively low, even though the carburetor is attached to the crankcase 62, to improve the performance of the engine and to facilitate restarting of the engine if the lawn mower has been temporarily turned off. If the carburetor 66 is permitted to overheat, liquid fuel may vaporize in the carburetor and restarting of the lawn mower can become difficult. Additionally, the air flowing into the carburetor 66 will be heated and the mass flow through the carburetor will be accordingly reduced.

In lawn mowers having a noise limiting housing covering the engine such as housing 26 shown in FIGS. 1 and 2, operation of the engine commonly causes heat to build up within the enclosure defined by the engine housing. Accordingly, the carburetor may be caused to operate in a high temperature environment. to prevent heating of the carburetor 66 of the engine 12, the invention includes means for shielding the carburetor from the heated air within the engine housing 26. While various arrangements can be provided, in the illustrated construction, the shielding means includes a carburetor housing 68 surrounding carburetor 66 and spaced inwardly from the walls of the engine housing 26. The carburetor housing 68 is supported by attachment to the cooling fan housing 54. Aligned apertures 72 and 74 in the cooling fan housing 54 and in the carburetor housing 68, respectively, provide for fluid communication from the cooling fan housing 54 into the inner chamber 70 of the carburetor housing 68.

In operation, rotation of the cooling fan 24 forces outside air through the apertures 72 and 74 into the carburetor housing 68 to provide for a flow of cooling air around the carburetor 66 and to provide for airflow into the carburetor. Since air is forced into the carburetor 66 by the cooling fan 24, the air flowing into the carburetor 66 is at an increased pressure, thereby resulting in greater mass flow through the engine 12 and consequent improved power output from the engine. Additionally, since the airflow into the carburetor is relatively cool outside air, the mass flow through the carburetor is greater than would be the mass flow if the air flowing through the carburetor was warmer air that had been heated by the engine.

Figure 3:
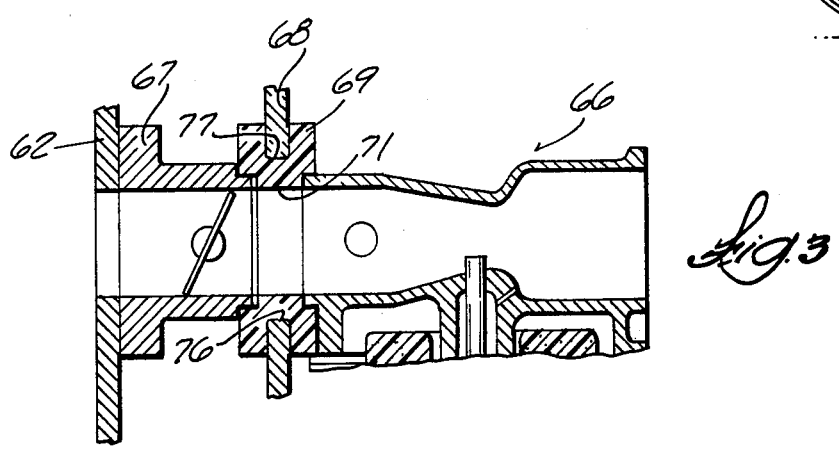
FIG. 3 is an enlarged cross section view of the carburetor and carburetor mounting means shown in FIG. 2.

Means are further provided to insulate the carburetor from the engine crankcase 62. While various arrangements can be employed, in the construction illustrated in FIG. 3, a carburetor mounting member 67 is attached to the crankcase 62 and supports the carburetor 66. The carburetor mounting member 67 and carburetor 66 are separated by an insulative phenolic gasket 69 which functions as a thermal dam between the carburetor 66 and the mounting member 67 to prevent conduction of heat from the crankcase 62 to the carburetor 66. The phenolic gasket 69 includes a stepped central bore 71 having opposed ends receiving the carburetor mounting member 67 and the carburetor 66. The carburetor mounting member 67 and the carburetor 66 are joined to the insulative gasket 69, for purposes of example, by an epoxy adhesive. The insulative phenolic gasket 69 is positioned within an aperture 76 in the carburetor housing, and the gasket 69 includes a circumferential groove 77 for receiving the edges of the carburetor housing 68 surrounding aperture 76.

Various of the features of the invention are set forth in the following claims.

What is claimed is:

1. A lawn mower comprising a blade housing, wheels supporting said blade housing for movement along the ground, a rotary cutting blade supported within said blade housing, an engine supported by said blade housing and rotatably driving said rotary cutting blade, a carburetor mounted on said engine, means for enclosing said engine including an engine housing surrounding said engine and including therein a first air intake opening, and means for shielding said carburetor from air heated by said engine within said engine housing, said shielding means including a carburetor enclosure surrounding said carburetor and located within said engine housing, said carburetor enclosure including a second air intake opening communicating with said first air intake opening.

2. A lawn mower comprising a blade housing, wheels supporting said blade housing for movement along the ground, a rotary cutting blade supported within said blade housing, an engine supported by said blade housing and rotatably driving said rotary cutting blade, a carburetor mounted on said engine, means for enclosing said engine including an engine housing surrounding said engine and including therein a first air intake opening, and means for shielding said carburetor from heated air within said engine housing, said shielding means including a carburetor enclosure surrounding said carburetor, said carburetor enclosure including a seond air intake opening communicating with said first air intake opening, said shielding means further including a thermal dam between said carburetor and said engine.

3. A lawn mower as set forth in claim 1 and further including means for conducting air from said first air intake opening into said second air intake opening including a fan housing communicating with said first air intake opening and with said second air intake opening, and fan means for conveying air through said first air intake opening into said fan housing and from said fan housing through said second air intake opening into said carburetor enclosure.

4. A lawn mower as set forth in claim 3 and wherein said fan means is a rotary fan driven by said engine.

5. A lawn mower as set forth in claim 3 wherein said carburetor enclosure is attached to said fan housing and is supported by said fan housing.

6. A lawn mower comprising a blade housing, wheels supporting said blade housing for movement along the ground, a rotary cutting blade supported within said blade housing, an engine supported by said blade housing and rotatably driving said rotary cutting blade, a carburetor mounted on said engine, means for enclosing said engine including an engine housing surrounding said engine and including a top wall and side walls, said housing also including therein a first air intake opening, and means for shielding said carburetor from heated air within said engine housing, said shielding means including a carburetor enclosure surrounding said carburetor, enclosed within said engine housing, and spaced from said walls of said engine housing, said carburetor enclosure including a second air intake opening communicating with said first air intake opening.

7. A lawn mower comprising a blade housing, wheels supporting said blade housing for movement along the ground, a rotary cutting blade supported within said blade housing, an engine supported by said blade housing and rotatably driving said rotary cutting blade, said engine including a crankcase chamber and a carburetor connected to said crankcase chamber for conveying fuel to said crankcase chamber, means for enclosing said enging including an engine housing surrounding said engine and including a top wall, side walls and a first air intake opening in one of said walls, means for shielding said carburetor from heated air within said engine housing, said shielding means including a carburetor enclosure disposed within said engine housing and spaced from said walls, said carburetor enclosure surrounding said carburetor and including a second air intake opening providing fluid communication into said carburetor enclosure, means for conducting air from said first air intake opening into said second air intake opening, said conducting means including a fan housing communicating with said first air intake opening, and fan means in said fan housing for conveying air through said first air intake opening into said fan housing and for forcing air from said fan housing through said second air intake opening into said carburetor enclosure, said fan means being driven by said engine, and a thermal dam between said carburetor and said crankcase chamber.

* * * * *